J. W. CLOSE.

RAILWAY FROG AND RAIL COUPLING.

No. 10,170. Reissued Aug. 1, 1882.

Witnesses.

Harry King

John McVoorhees

Inventor.

John W. Close

By his Attorneys,

Stansbury & Munn

N. PETERS, Photo-Lithographer, Washington, D. C.

UNITED STATES PATENT OFFICE.

JOHN W. CLOSE, OF BUFFALO, NEW YORK.

RAILWAY-FROG AND RAIL-COUPLING.

SPECIFICATION forming part of Reissued Letters Patent No. 10,170, dated August 1, 1882.

Original No. 114,409, dated May 2, 1871. Application for reissue filed September 3, 1879.

*To all whom it may concern:*

Be it known that I, JOHN W. CLOSE, of Buffalo, in the county of Erie and State of New York, have invented certain new and useful Improvements in Railway-Frogs and Rail-Couplings; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
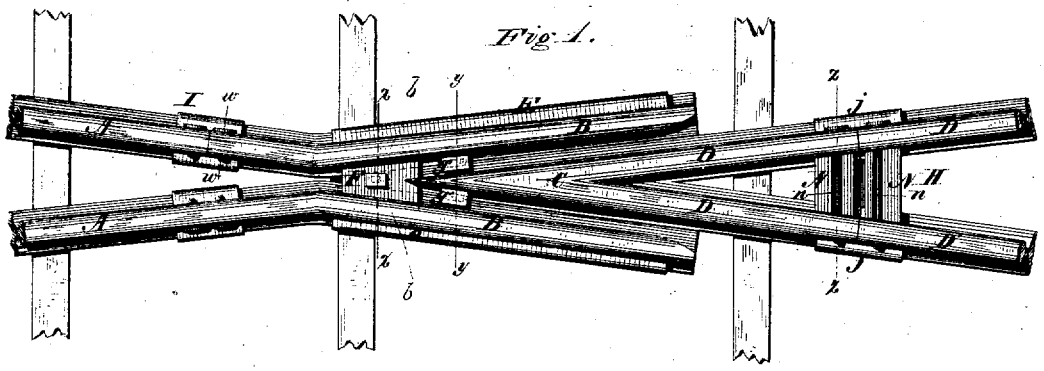
Figure 8:
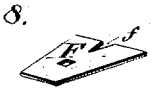
Figure 2:
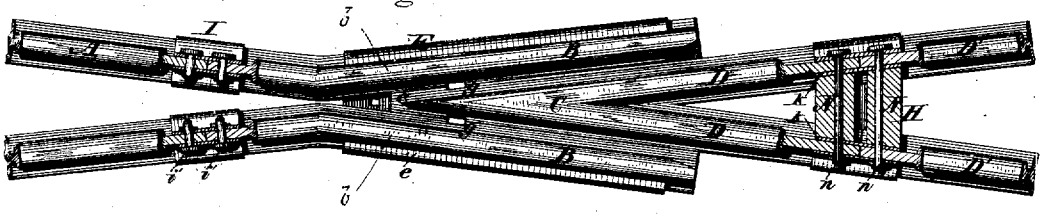
Figure 3:
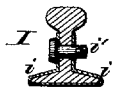
Figure 4:
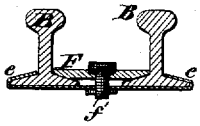
Figure 5:
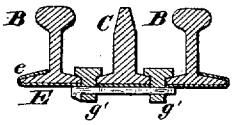
Figure 6:
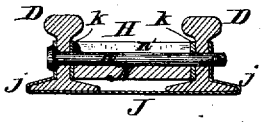
Figure 7:
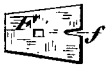

Figure 1 is a plan view of my improved frog and rail-couplings. Fig. 2 is a partially-sectional plan view, showing some of the parts removed. Fig. 3 is a cross-section on line *w w*, Fig. 1. Fig. 4 is a similar section on line *y y*, Fig. 1. Fig. 5 is a section on line *y y*, Fig. 1. Fig. 6 is a cross-section on line *z z*, Fig. 1. Fig. 7 is a plan view of the wedge-plate. Fig. 8 is a perspective view of the same.

Like letters designate like parts in all the figures.

My improvements relate to the means for securing in place railroad-frogs and the rails which connect therewith, consisting of a wrought-iron base-plate extending under both rails and overlapping the outer edges thereof, in connection with fish-plates, wedge-plates, or blocks and bolts for securing the parts together, as hereinafter more specifically and fully set forth.

A A are the converging rails of a railroad-frog. B B are the wings thereof, contracted at *b b*.

C is the point formed by the junction of the rails D D, and fitting between the wings so as to form a connection with the wing-rails B B.

E is a bed-plate of wrought-iron of nearly the length of the wing-rails, arranged under the latter and the point C. Its edges *e e* are swaged or bent up so as to overlap and inclose the outer edges of the bases of the wing-rails B B. The overlapping flanges *e e* are made to inclose the exterior side of the webs of said rails, to which they may be fastened by screw-bolts, if this construction is preferred. The contiguous edges of the base of the point C and the bases of the wing-rails B B are provided with rectangular notches *g g*, through which pass bolts *g′ g′*, which penetrate the bed-plate E, and are fastened on the under side of the latter by a key or equivalent, as clearly represented in Fig. 5.

F is a wedge or stay plate introduced between the wing-rails, and resting on the bases thereof and on the base *c* of the point C of the frog. The latter fits in a notch, *f*, formed in the adjacent edge of said wedge-plate. The wedge F is located wholly between the contracted portions *b b* of the wings B B and the point C of the frog, thereby holding the parts in rigid relation horizontally and enabling large parts to be used, as shown. The bed-plate E and the wedge-plate F are secured together by a bolt, *f′*, passing through both and locked by a key or screw-nut or by any other suitable means.

The operation of this part of my improvements is as follows: The base-plate E connects by means of its overlapping edges *e e* the wing-rails B B, and prevents separation of said rails, and forms at the same time a support for the point C of the frog. The combination of the wedge-plate F with the base-plate E serves to keep the wing-rails at the proper distance apart, and to secure the point C against lateral and vertical displacement. The bolts *g′ g′*, by fitting in the contiguous notches of the base of the point C and the bases of the wing-rails, securely hold the same against longitudinal displacement, and by their being fastened to the bed-plate E prevent relative vertical displacement of the parts.

H represents my improved coupling and chair for double rails. It also consists of a plate, J, of wrought-iron, which extends under the ends of the four rails D D D′ D′, with the edges *j j* of the plate turned up so as to overlap the outer bases and webs of the rails, in the manner and as clearly represented. Fish-plates *k k* are applied to the inner sides of the webs opposite these upturned edges *jj*. Wedge-blocks or stays N N are introduced between these fish-plates, filling the space between them and pressing them against the webs of the rails. Fastening-bolts *n n* pass through the flanges *j j*, webs, and fish-plates, and through these wedge-blocks, or in a groove or channel, *n′*, formed in their upper side, and secure the whole together. If desired, the wedge-block N may be omitted and the fish-plates *k k* fastened to the rails and outer flanges by bolts, as in any ordinary fish-joints. This device firmly holds the ends of the rails abutting against displacement in either direction, and secures both rails in their proper relative position to each other. It can be applied to a joint intermediate between the ties, as no base support is required therefor.

I represents a coupling and chair, which may be used for single rails. It consists of a plate of wrought-iron arranged under the abutting ends of the rails A B, with its edges *i i* swaged or bent up so as to overlap the bases and webs of the rails on both sides. Bolts *i′ i′* pass through the edges *i i* and the webs of the rails, securing the parts together, as represented. This joint is also adapted for intermediate joints, since no base support is necessary.

In English Patent No. 627 of 1863 is shown a block which comes around the tip of the point of the frog; but this block is very heavy and cumbersome, and is integral with the chair.

In English Patent No. 292 of 1856 is shown a flange-bearer, the point of which comes between the wings and the point of the frog, its ends extending alongside of and beyond said point. This is a heavy and large piece intended to bear the weight of the rolling stock as it passes over the frog. The wedge in the present instance is a light piece of metal coming between the tip of the frog-joint and the guard-rails, and serving as a lock to hold the parts in place.

What I claim is—

1. The arrangement of the bolts *g′ g′* with the notches *g g*, point C, rails B B, and base-plate E, as hereinbefore set forth.

2. The wedge-plate F and bolt *f′*, arranged with the rails B B, point C, and base-plate E, substantially as and for the purpose hereinbefore set forth.

3. The combination and arrangement, with the rails D D D′ D′, of the wrought-iron base-plate J, with overlapping edges *j j*, and fish-plates *k k*, secured by bolts, substantially as hereinbefore set forth.

4. The combination and arrangement, with the rails D D D′ D′, base-plate J, flanges *j j*, and fish-plates *k k*, of the wedge-blocks N N and bolts *n n*, as hereinbefore set forth.

5. The wings B B, contracted at *b b*, and the frog D D C, in combination with the wedge-plate F, having the notch *f*, and located wholly between the point of the frog and the contracted portions of the wings, as set forth.

In testimony that I claim the foregoing I have hereunto set my hand this 25th day of August, 1877.

J. W. CLOSE.

Witnesses:
GEO. F. GRAHAM,
CHAS. T. STANSBURY.